United States Patent [19]

Speaker

[11] 4,437,395
[45] Mar. 20, 1984

[54] SPAGHETTI AND FOOD COOKER

[76] Inventor: Richard L. Speaker, 113 E. Brentwood Rd., Greensboro, N.C. 27403

[21] Appl. No.: 364,900

[22] Filed: Apr. 2, 1982

[51] Int. Cl.³ .............................................. A47J 27/10
[52] U.S. Cl. ...................................... 99/355; 99/409; 99/427; 99/448
[58] Field of Search ................. 99/427, 431, 355, 403, 99/407, 409, 410, 411, 443 R, 448, 450

[56] References Cited

U.S. PATENT DOCUMENTS

| | | | |
|---|---|---|---|
| 1,515,003 | 11/1924 | Watson | 99/403 X |
| 1,599,805 | 9/1926 | Barsam | 99/409 |
| 2,222,314 | 11/1940 | Husk | 99/410 X |
| 3,608,473 | 9/1971 | Kearn | 99/407 X |
| 3,718,485 | 2/1973 | Lankford | 99/410 X |
| 3,908,535 | 9/1975 | Gordon | 99/450 X |

FOREIGN PATENT DOCUMENTS

| | | | |
|---|---|---|---|
| 2832659 | 4/1979 | Fed. Rep. of Germany | 99/407 |
| 1141056 | 2/1956 | France | 99/410 |
| 1261308 | 9/1961 | France | 99/409 |
| 7004 | of 1892 | United Kingdom | 99/427 |
| 1303662 | 1/1973 | United Kingdom | 99/407 |

*Primary Examiner*—Billy J. Wilhite
*Assistant Examiner*—Christine A. Peterson

[57] ABSTRACT

A spaghetti and food cooker for cooking individual portions having a housing containing a pair of adjacent segregated temperature-controlled cooking chambers, a pivotable bracket movable from one chamber to the other, a series of perforated compartments for retaining individual food portions clustered and mounted on said bracket, motor-controlled means for positioning said bracket with said compartments into one of said temperature-controlled cooking chambers for a predetermined time cycle for cooking and displaying said compartments through one of said temperature-controlled compartments before elevating and pivoting the bracket and supported compartments out of said chamber and pivoting the bracket and supported compartments into the other chamber for further treatment and displacing said compartments through the other chamber before elevating the bracket and compartments to a discharge position for draining above said chambers for unloading the individual portions from their compartments.

10 Claims, 6 Drawing Figures

SPAGHETTI AND FOOD COOKER

BACKGROUND AND OBJECTIVES OF THE INVENTION

Various forms of automated spaghetti and pasta cooking apparatuses have been employed to prepare large batches early in the day, held in appropriate temperature-controlled storage, and reheated just prior to serving. The resulting product has degenerated substantially and is normally considered unsatisfactory by fine restaurants who specialize in serving gourmet "al dente" pasta.

A number of various approaches for achieving desirable results in a spaghetti, pasta and food cooker are illustrated in U.S. Pat. Nos. 3,430,553; 3,608,473; 3,827,344; 3,937,135; 3,958,503; and 4,214,514, among others. However, many of such references are for "dose cookers" enabling individual portions of pasta which includes spaghetti, macaroni, noodles and other similar products to be cooked and processed before serving, and some of the devices have been utilized for rapid and controlled cooking in hot water using metered quantities of the products to be cooked including service for fast food establishments.

The present invention endeavors to provide a controlled cooking environment for pasta that will enable an eating establishment to provide a wide range of requirements for the blanching, cooking and rinsing cycles including a pre-set cycle to achieve a gourmet presentation for individualized portions of pasta including fine-tuning of temperature controls of the heating medium in separate compartments, agitating individual compartments that contain separate servings and utilizing a minimum of energy for heating the water that is to be consumed in each cycle and to avoid starch buildup on the equipment.

A primary objective of this invention is to provide a spaghetti and food cooker in which individualized portions may be cooked simultaneously in spaced temperature controlled baths for predetermined cycles and readily removed after a predetermined period of time depending on the varieties of pasta to be cooked so that freshly cooked individualized portions may be served.

Another objective of the present invention is to provide a spaghetti and food cooker in which a series of individualized compartments contain a portion of product to be served that may be blanched, cooked, rinsed and removed at predetermined cycles of operation to achieve maximum control over the product to be served.

Yet another objective of the present invention is to provide a spaghetti and food cooker in which individualized portions are segregated into a series of separated individual compartments which are displaced or rotated within separated chambers containing water baths for blanching, cooking, washing and rinsing, under temperature controlled conditions, and displacing the series of compartments containing the individualized portions to be served from one heated chamber to another automatically for a specific period of time that may be modified for the particular product to be cooked.

Other objectives and many of the advantages of this invention will become more readily apparent to those skilled in the art of spaghetti, pasta and food cooking taken in conjunction with the accompanying drawing and claims in which equivalents and modifications are contemplated.

DETAILED DESCRIPTION OF PREFERRED EMBODIMENT OF INVENTION

Figure 1:
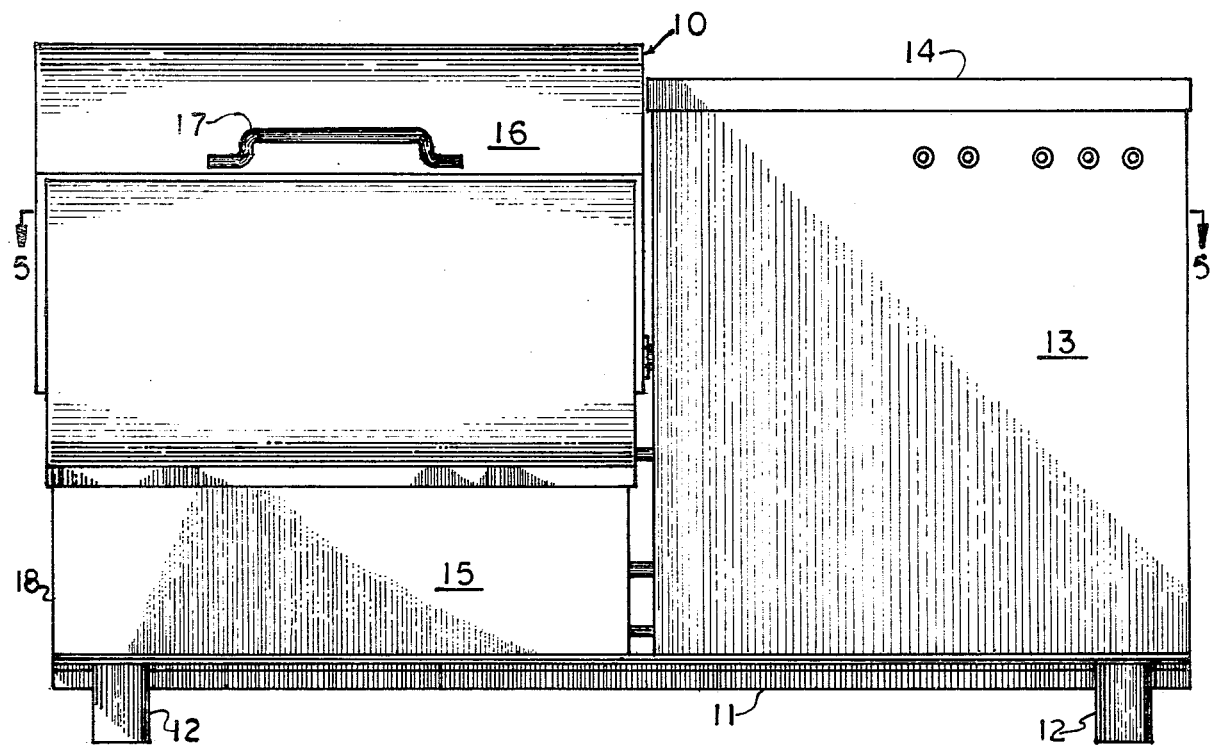
FIG. 1 is a front elevational view of a spaghetti or food cooker shown in the closed position during a cooking cycle.
Figure 2:
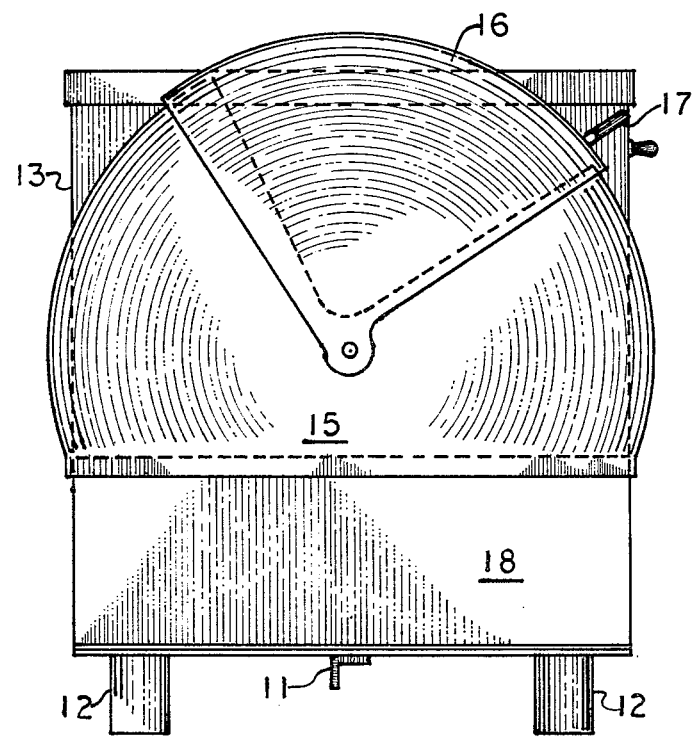
FIG. 2 is a left side elevational view of FIG. 1.
Figure 3:
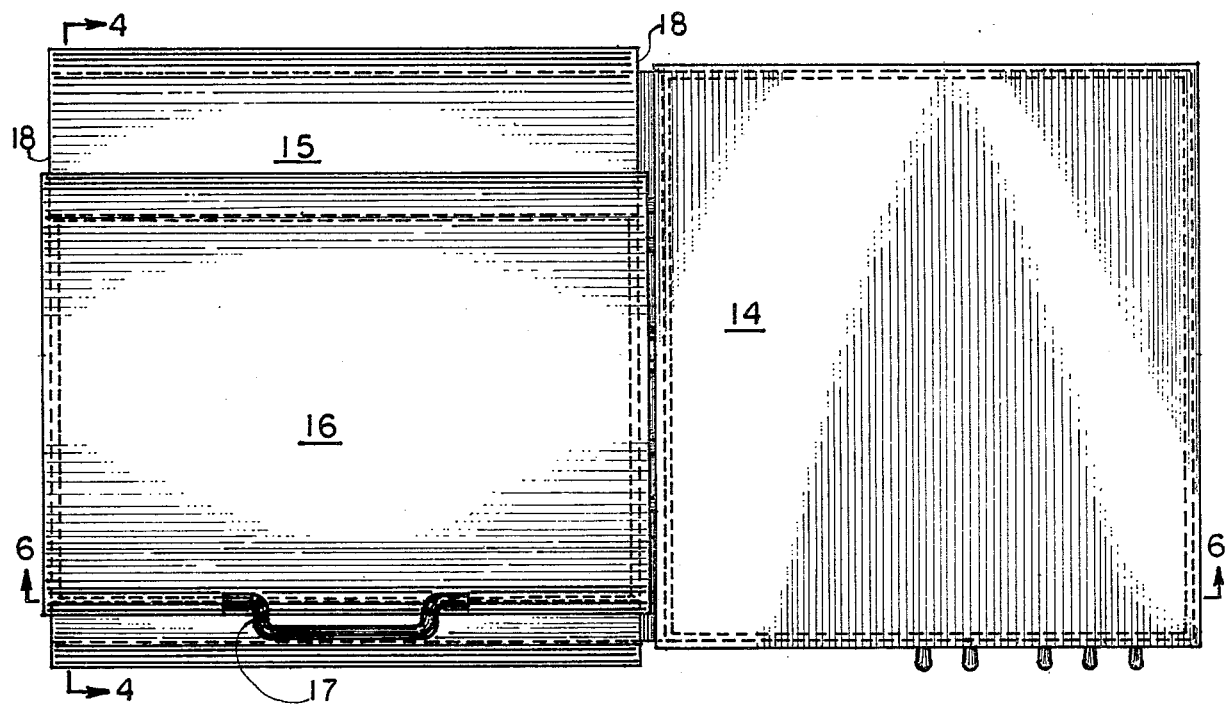
FIG. 3 is a top plan view of FIG. 1.

Referring to the drawing and particularly to FIGS. 1-3, there is illustrated a spaghetti and food cooker 10 mounted on a base 11 with depending legs 12 for elevating the cooker above a platform. A stainless steel housing 13 is provided with a removable cover member 14 in which the controls including timers, solenoid valves, motors and drives are housed as more fully shown in FIGS. 5 and 6. The spaghetti and food cooker section 15 is provided with a stainless steel housing to enclose the interior and includes a closure door 16 which is pivotally mounted at opposite sides of the housing 15 and may be lowered to enclose the housing or opened by means of the handle 17, as shown in FIGS. 1-3. The cooker 10 is in the closed operating condition in FIGS. 1-3. The housing ends 18 enclose each end of the cooker above the base 11 that is mounted directly above the base legs 12.

Figure 4:
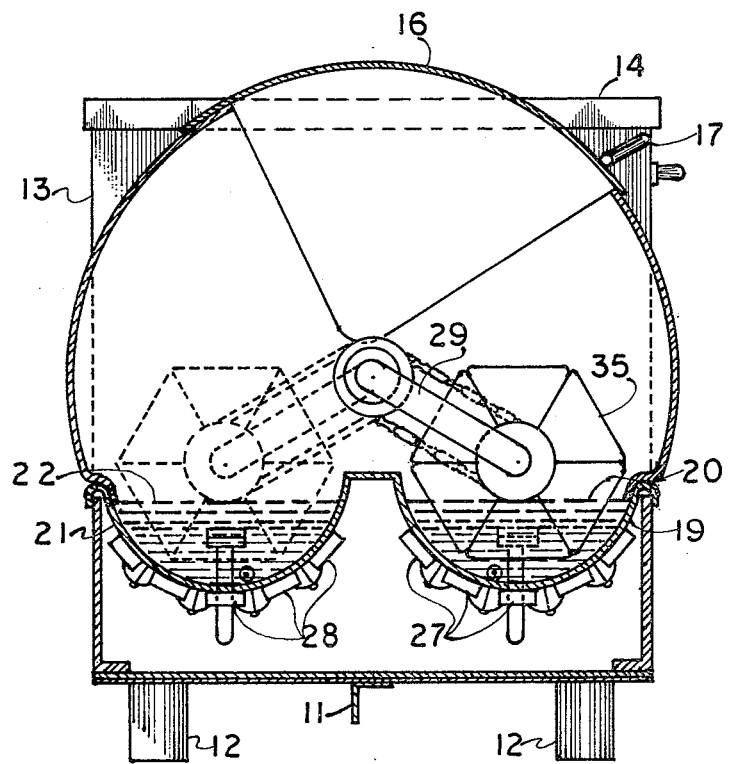
FIG. 4 is a partial transverse sectional view taken substantially along line 4—4 of FIG. 3.

As shown in FIG. 4, a first chamber 19 of stainless steel and arcuate configuration with a generally concave interior is provided for retaining water 20 therein at a suitable level and is adjacent to a second chamber 21 of substantially the same material and cross-sectional configuration for retaining water 22 therein. The water 20 in chamber 19 and the water 22 in chamber 20 will be supplied through inlet openings 23 and 24, respectively, through solenoid operated valves of conventional construction, for admitting water under pressure and for draining the water from each chamber, through drain outlets 25 and 26. A series of electrically-energized heating elements 27 is mounted securely to the underside of the first chamber 19 for heating the water to a controlled temperature. Additionally, a series of electrically-energized heating elements 28 is provided beneath the chamber 21 for controlled heating of the water 22 in chamber 21. Auxiliary preheated water lines (not shown) may be used to heat the water in chambers 21 and 22 in addition to the elements 27 and 28.

A pair of bracket arms 29 is securely mounted within the cooker housing directly above and between the chambers 19 and 21 for pivotable displacement from one chamber to the other. The brackets 29 have distal ends 30 on which are mounted compartment-retaining members 31 and 32 for cooperatively receiving and releasably retaining the end members 33 and 34 that form the closures for the elongated perforated spaghetti or food retaining perforated triangularly-shaped sectional compartments 35 that are arranged for retention and releasable mounting on the retaining members 33 and 34 through an interlocking groove and lug arrangement (not shown) enabling individual compartments 35 to be removed and replaced through the compression of spring member 34' that encircles a stub shaft (not shown) on which the members 33 and 34 are mounted so that the compartment-retaining member 33 may be displaced axially to releasably retain the compartments 33 in position or disengage said members 33 and the compartment 35. Alternatively, the compartments 35 may be provided with hinged closure doors (not shown) with the compartment ends secured to the end members 33 and 34, and the spaghetti and food may be removed transversely to the compartment axis.

Figure 5:
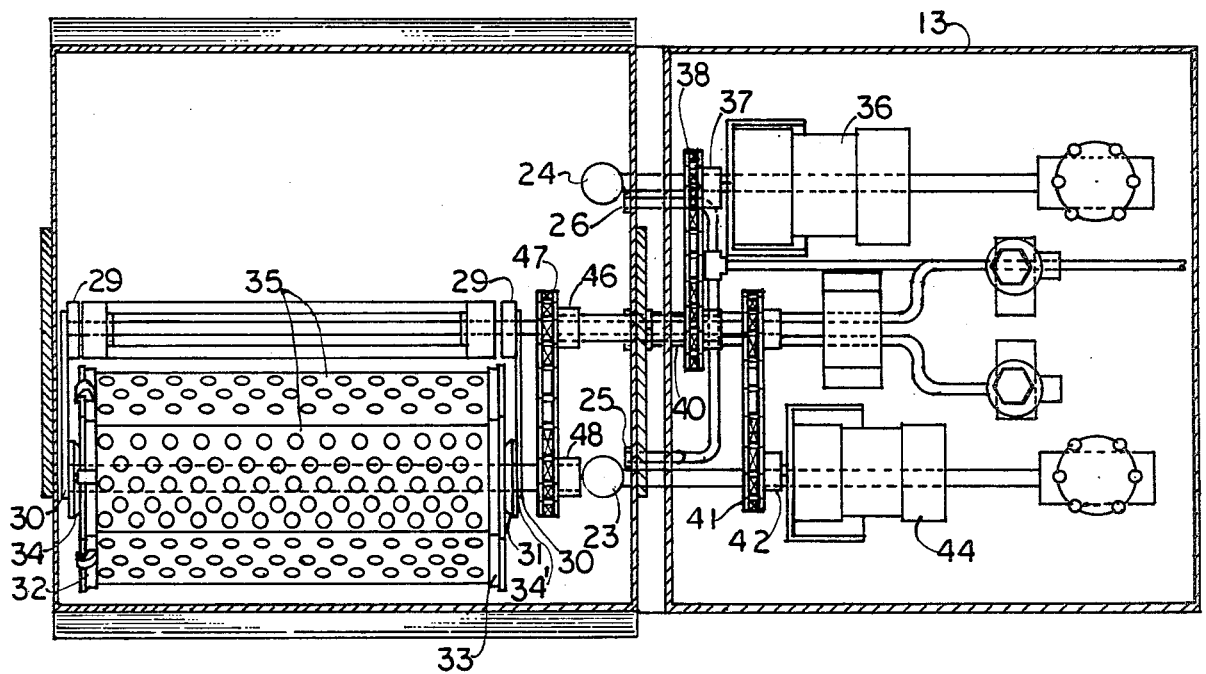
FIG. 5 is a partial longitudinal sectional view taken substantially along line 5—5 of FIG. 1.
Figure 6:
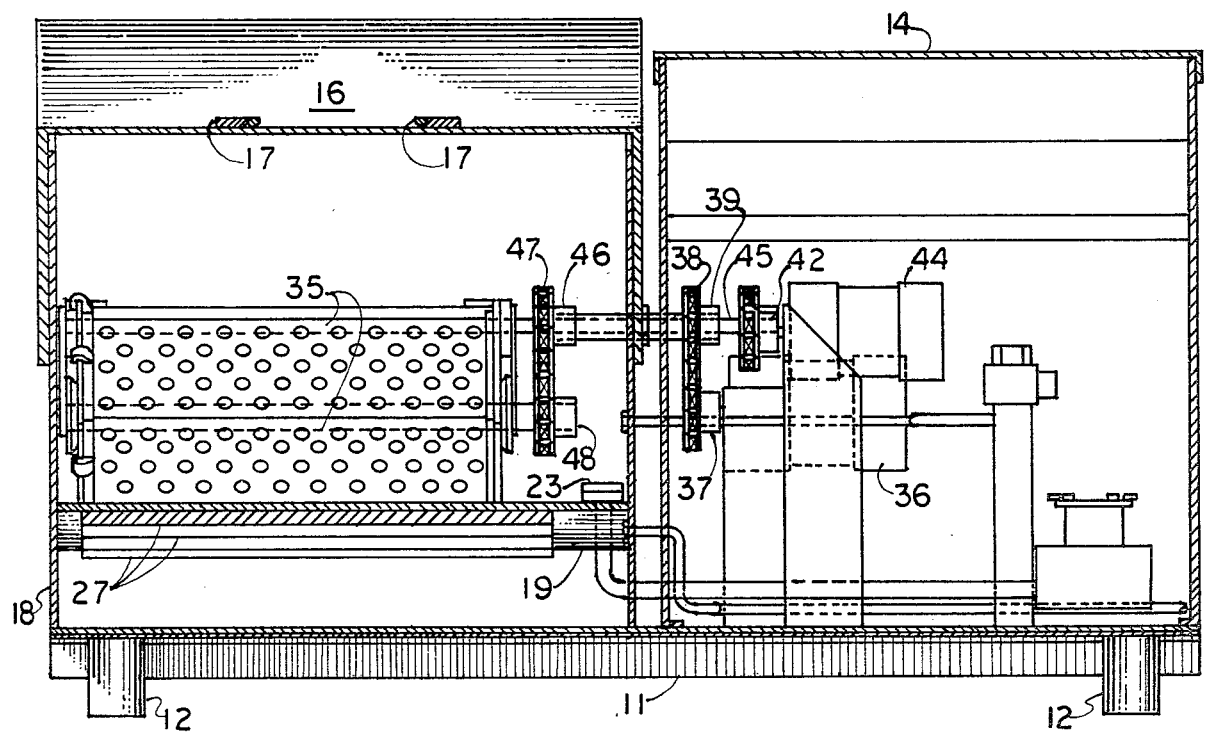
FIG. 6 is a partial longitudinal sectional view taken substantially along line 6—6 of FIG. 3.

The series of elongated perforated food-retaining compartments 35, as shown in FIGS. 4 and 5, are arranged in a cluster, as illustrated in FIG. 4, in which six (6) food-retaining compartments 35 may be retained together and individually removed from the bracket arms 29 so that individual portions of pasta may be cooked in each of the chambers 19 and 21 and then the bracket arms 29 may be positioned in a vertical orientation facilitating removal of the individual compartments f35 from the bracket compartment retaining members 33 and 34.

Motor 36 drives the sprocket wheel 37 on which the drive chain 38 is retained for passing over the chain driven sprocket 39 which is keyed to the shaft 40 on which the bracket members 29 are mounted. Actuation of the motor 36 through the drive train including the chain 38 will pivot the bracket members 29 from one chamber 19 to the other chamber 21 in a selected predetermined time sequence, and reversal from chambers 21 to 19, as desired. The chain 41 mounted on the chain sprocket 42 extends over the sprocket 43 which is driven by the motor 44 when actuated. Sprocket 42 will rotate stub shaft 45 which passes through sprocket 39 and shaft 40 to drive sprocket 46 and chain 47 mounted on sprockets 46 and 48 which is on the distal end of bracket 29. When motor 44 is actuated, it will rotate sprocket 43 which in turn will rotate sprocket 42 to revolve shaft 45 and the food-retaining compartments 35 will be displaced in the chambers 19 or 21 through the water therein during the blanching or cooking cycles by the travel of chain 47 which rotates sprocket 48.

In the cooking operation commencing from start-up, after the power is turned on, the bracket arms 29 will be positioned to the loading position and the chambers 19 and 21 will be filled to the appropriate water level and each of the chambers will be heated to a cooking temperature. A selected cooking time will be determined for the particular food that is to be processed. When the first chamber 19 is heated to the appropriate temperature for cooking, the bracket arms 29 will be located to position the food-retaining compartments 35 into the heated fluid 20 and 22 for an appropriate cooking time that is predetermined by conventional means. At the end of the cooking cycle, the bracket members 29 will be elevated to remove the compartments 35 from the heating fluid 20 to 22 for rinsing. The rinse cycle may be determined by a timing device of conventional construction. The bracket members 29 are then pivoted into the direction of the chamber 22 for immersion into the heated fluid 22. The period of time in the chamber 22 will vary depending upon the desired results.

The rotation of displacement of the compartments 35 will achieve the proper velocity of water past pasta to "wash" it similar to the action of rapidly boiling water of large volume with pasta tumbling through it. The displacement permits the use of a smaller quantity of water and utilization of less energy during the cooking cycle.

I claim:

1. A spaghetti and food cooker comprising; a first chamber and a second chamber in side by side juxtaposition to each other for retaining a fluid in each chamber, means for controlled heating the fluid in each chamber, and an elongated perforated food-retaining compartment having means for loading and unloading spaghetti or food into and out of said compartment, a pair of brackets longitudinally spaced from each other and pivotally mounted above said chambers, said brackets each having distal ends, said distal ends of said brackets having compartment-retaining means thereon for securing said food-retaining compartment thereon, means for pivoting said pair of brackets with said food-retaining compartment secured thereon into and out of each of said chambers by oscillatory movement of said brackets, and means associated with at least one of said brackets for rotating said compartment while retained in said chambers.

2. A sphagetti and food cooker as claimed in claim 1, a series of said elongated perforated food-retaining compartments mounted in a cluster on said distal ends of said brackets on said compartment-retaining means.

3. A spaghetti and food cooker as claimed in claim 1, and means for displacing said elongated perforated food-retaining compartment in said first and second chambers while supported on said distal ends of said brackets by said compartment-retaining means.

4. A spaghetti and food cooker as claimed in claim 2, and means for displacing said series of said elongated perforated food-retaining compartments in said first and second chambers while supported on said distal ends of said brackets by said compartment-retaining means.

5. A spaghetti and food cooker as claimed in claim 1, and means for supplying and draining fluid into and out of each of said chambers.

6. A spaghetti and food cooker as claimed in claim 1, a base for supporting said chambers, a housing enclosing said chambers, said brackets and said elongated perforated food-retaining compartment, and a closure member pivotally mounted on said housing for sealing said housing in the closed condition and exposing at least said elongated perforated food-retaining compartment while in an elevated position for spaghetti or food removal from and loading into said compartment on said bracket distal ends.

7. A spaghetti and food cooker as claimed in claim 1, said means for heating the fluid in each chamber including electrically energized heating elements mounted to heat fluid in each of said chambers.

8. A spaghetti and food cooker as claimed in claim 1, and motorized means for pivoting said brackets with said elongated perforated food-retaining compartment mounted thereon into and out of each chamber.

9. A spaghetti and food cooker as claimed in claim 8, and motorized means for displacing said elongated perforated food-retaining compartment when said compartment is positioned within each of said chambers.

10. A spaghetti and food cooker as claimed in claim 1, a series of said elongated perforated food-retaining compartments mounted in a cluster on said distal ends of said brackets by said compartment-retaining means, means for supplying and draining fluid from each of said chambers, motorized means for pivoting said brackets with said series of elongated perforated food-retaining compartments mounted thereon into and out of each of said chambers, motorized means for displacing said series of compartments in each of said chambers, a base for supporting said chambers, a housing enclosing said chambers and said brackets and said series of compartments, and a closure member pivotally mounted on said housing for sealing said housing in the closed position and exposing at least said series of compartments in the open position for removal upon removal from said chambers through said compartment-retaining means.

* * * * *